(12) United States Patent
Preston

(10) Patent No.: US 7,172,158 B2
(45) Date of Patent: Feb. 6, 2007

(54) RAM AIR PARACHUTE CANOPY WITH TRAPEZOIDAL CELLS

(75) Inventor: Daniel Preston, Kew Gardens, NY (US)

(73) Assignee: Atair Aerospace, Brooklyn, NY (US)

( * ) Notice: Subject to any disclaimer, the term of this patent is extended or adjusted under 35 U.S.C. 154(b) by 0 days.

(21) Appl. No.: 10/315,510

(22) Filed: Dec. 9, 2002

(65) Prior Publication Data
US 2003/0209634 A1 Nov. 13, 2003

Related U.S. Application Data

(60) Provisional application No. 60/341,053, filed on Dec. 7, 2001.

(51) Int. Cl.
*B64D 17/02* (2006.01)

(52) U.S. Cl. .................................. 244/145; 244/142

(58) Field of Classification Search ............... 244/126, 244/142, 143, 145–146, 152, 153 R
See application file for complete search history.

(56) References Cited

U.S. PATENT DOCUMENTS

| | | | | |
|---|---|---|---|---|
| 2,365,184 A | * | 12/1944 | Frieder et al. | 244/145 |
| 3,524,613 A | * | 8/1970 | Reuter et al. | 244/142 |
| 3,724,789 A | * | 4/1973 | Snyder | 244/145 |
| 3,749,337 A | * | 7/1973 | Jalbert | 244/145 |
| 4,389,031 A | * | 6/1983 | Whittington | 244/145 |
| 4,399,969 A | * | 8/1983 | Gargano | 244/145 |
| 4,540,145 A | * | 9/1985 | Matsuo | 244/152 |
| 4,749,156 A | * | 6/1988 | Davenport et al. | 244/145 |
| 4,781,343 A | * | 11/1988 | Brown | 244/145 |
| 4,811,920 A | * | 3/1989 | Askwith et al. | 244/145 |
| 5,082,210 A | * | 1/1992 | Morehead, Jr. | 244/145 |
| 5,967,463 A | * | 10/1999 | Payne | 244/145 |

* cited by examiner

*Primary Examiner*—Timothy D. Collins
(74) *Attorney, Agent, or Firm*—Bourque and Associates

(57) ABSTRACT

The canopy of the ram air parachute of the present invention has cells which are trapezoidal in shape. The non-loaded ribs of the canopy are shorter in height than the loaded ribs. The different height ribs results in tensioning of the bottom skin and transfer of forces from the loaded rib-bottom skin junction through the bottom skin to the non-loaded rib. The non-loaded rib is then tensioned to not float up as high. Thus, the spanwise distortion of the top skin is reduced and the aerodynamics are improved.

6 Claims, 3 Drawing Sheets

RAM AIR PARACHUTE CANOPY WITH TRAPEZOIDAL CELLS

This application claims priority to U.S. Provisional Application Ser. No. 60/341,053, filed Dec. 7, 2001.

BACKGROUND OF THE INVENTION

1. Field of the Invention

The present invention relates to ram air parachutes and more particularly to ram air parachutes having an improved canopy design.

2. Discussion of Related Art

Parachutes have evolved over the years into highly sophisticated systems, and often include features that improve the safety, maneuverability, and overall reliability of the parachutes. Initially, parachutes included a round canopy. A skydiver was connected via a harness container system to the canopy by suspension lines disposed around the periphery of the canopy. Such parachutes severely lacked control. The user was driven about by winds with little mechanism for altering direction. Furthermore, such parachutes had a single descent rate based upon the size of the canopy and the weight of the parachutist. They could not generate lift and slowed descent only by providing drag.

In the mid-1960's the parasol canopy was invented. Since then, variations of the parasol canopy have replaced round canopies for most applications, particularly for aeronautics and the sport industry. The parasol canopy, also known as a ram air canopy, is formed of two layers of material—a top skin and a bottom skin. The skins may have different shapes but are commonly rectangular or elliptical. The two layers are separated by vertical ribs to form cells. The top and bottom skins are separated at the lower front of the canopy to form inlets. During descent, air enters the cells of the canopy through the inlets. The vertical ribs are shaped to maintain the canopy in the form of an airfoil when filled with air. Suspension lines are attached along at least some of the ribs to maintain the structure and the orientation of the canopy relative to the pilot. The canopy of the ram air parachute functions as a wing to provide lift and forward motion. Guidelines operated by the user allow deformation of the canopy to control direction and speed. Ram air parachutes have a high degree of maneuverability.

Canopies are flexible and stretchable membrane structures, they distort based upon mechanical and aerodynamic tensions, stresses, airflows and pressure distribution. Although a cell is modeled as having a basically rectangular cross section, when inflated the shape distorts towards round with complex distortions. Under canopies of conventional design, the leading edge or nose of the ram air parachute is deformed during flight as is the top profile of the airfoil between the ribs. Additionally, with forward motion, the head-on wind overcomes the internal pressurization of the canopy, and deforms the nose of the canopy. This distortion blunts the nose of the airfoil or even indents it, impairing the aerodynamics of the parachute wing. The parachute flies less efficiently as a result. Therefore, a need exists for a ram air parachute canopy which reduces nose distortion and spanwise topskin distortion.

The shape of the canopy of a ram air parachute during flight is affected by the air passing through and around the canopy. Under canopies of conventional design, the leading edge or nose of the ram air parachute is deformed during flight. Since the skins and ribs are formed of highly flexible materials, they provide little structure for maintaining the shape of the canopy. The shape is provided by the internal pressurization caused by air entering the inlets.

Typically, in a ram air parachute, suspension lines are attached to every other rib, thus creating loaded ribs (i.e., ribs to which suspension lines are attached) and non-loaded ribs (i.e., ribs which do not have suspension lines attached thereto). The different stresses on the loaded and non-loaded ribs also distorts the cell shape. FIG. 1 illustrates a cross section of a portion of a typical ram air parachute canopy 500 during flight. FIG. 1 shows four cells 501, 502, 503, 504 with three loaded ribs 510, 511, 512 and two non-loaded ribs 521, 522. Suspension lines 541, 542, 543 are attached to the loaded ribs 510, 511, 512. The top skin 530 and bottom skin 531 tend to arc between the ribs during inflation. Also, the non-loaded ribs 521, 522 tend to be higher than the loaded ribs 510, 511, 512, which provides a distortion along the span of the canopy. The distortion is aerodynamically undesirable and reduces the efficiency and performance of the canopy.

In order to keep the loaded and non-loaded ribs level and to improve upon the aerodynamics of the canopy, cross-bracing between ribs has been added to some canopy designs. Cross bracing is the use of diagonal ribs in addition to vertical ribs to create more loaded rib--top skin junctions without adding more lines which increases drag and possible deployment malfunctions. Perfection of the top profile of the airfoil is far more important aerodynamically than the bottom profile. U.S. Pat. No. 4,930,927 illustrates such a design. Cross-braced designs suffer from a number of drawbacks. Cross-bracing results in very complicated construction, high manufacturing costs, and increased packing volume. The standard cross braced design is a 'tri cell' construction with a packing volume approximately twenty-five (25)% larger than an equivalent non-cross braced design. Furthermore, the increased rigidity induced by the cross-bracing creates higher opening forces for the pilot. Typically, large cross porting is used on all of the cells to reduce pack volume, which does no thing to slow the canopy's inflation on deployment. The opening the top skin 21a, 21b and bottom skin 22a, 22b. Suspension lines 51a, 51b are attached to the loaded ribs. As illustrated in FIG. 4, the loaded ribs 31, 33 are of the same height. The unloaded rib 32 is shorter in height than the loaded ribs 31, 33. The bottom skin 22 is not flat, but is angled between the loaded ribs 31, 33 and the non-loaded rib 32. The cell has a trapezoidal shape rather than the rectangular shape of conventional cells. During flight, a portion of the force applied from the suspension lines 51a, 51b to the loaded ribs 31, 32 is transferred via the now angled bottom skin portions 22a, 22b to the non-loaded rib 32. The load transfer results in an improved load distribution and reduced span-wise distortion of the top skin.

Sliders used to counteract the large opening forces on a cross-braced canopy often cause premature wear on the suspension lines of the canopy. A slider is a rectangular piece of material with a grommet at each corner. Grouped suspension lines pass through each grommet. When the parachute opens, the force of the opening canopy and separating suspension lines forces the slider down the suspension lines. Air resistance tends to slow movement of the slider and, hence, restrict opening of the canopy against the spreading force of the inflating canopy pushing the slider down. The most force on the slider comes from the lines to the outermost cells, which pushes the slider down rapidly caused friction heat. The heat changes the dimension of many standard types of lines (e.g., Spectra, dyneema brand lines). It is not uncommon for outer lines to change in dimension as much as five inches in only a couple of hundred jumps. Accordingly, cross braced canopies are almost exclusively supplied with Aramid based lines (e.g., Kevlar, Vectran, etc.). These lines do not change dimension with the generated slider-friction heat solving the problem stated above, but suffer from micro-fiber cracking. Accordingly, if over jumped, Aramid lines can break catastrophically with no warning.

Accordingly, a need exists for a parachute design which reduces the top skin distortion of a canopy without using cross braces.

SUMMARY OF THE INVENTION

The deficiencies of the prior art are substantially overcome by the canopy design of the present invention which reduces distortions without cross braces. According to one aspect of the invention, the heights of the ribs in the canopy are not uniform. Non-loaded ribs are shorter than loaded ribs at least at the front edge. This forms cells that are slightly trapezoidal in shape. The tension across the bottom skin is transferred to and pulls down the non-loaded ribs. This tensioning keeps the top portion of the non-loaded ribs from rising as much above the top portion of the loaded ribs. Thus, the top skin remains relatively even, reducing spanwise distortion and improving the aerodynamics of the canopy.

DETAILED DESCRIPTION OF PREFERRED EMBODIMENTS

Figure 1:
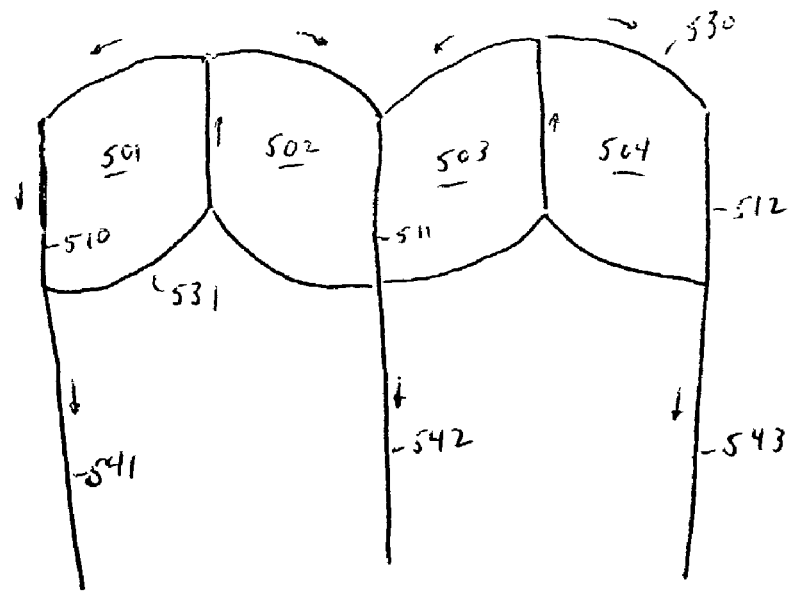
FIG. 1 is a cross section view of cells in non-cross-braced canopy of the prior art.
Figure 2:
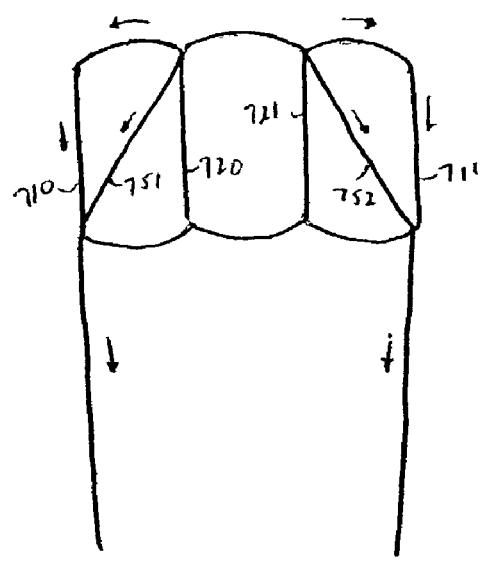
FIG. 2 is a cross section view of cells in a tri-cell canopy of the prior art.
Figure 3:
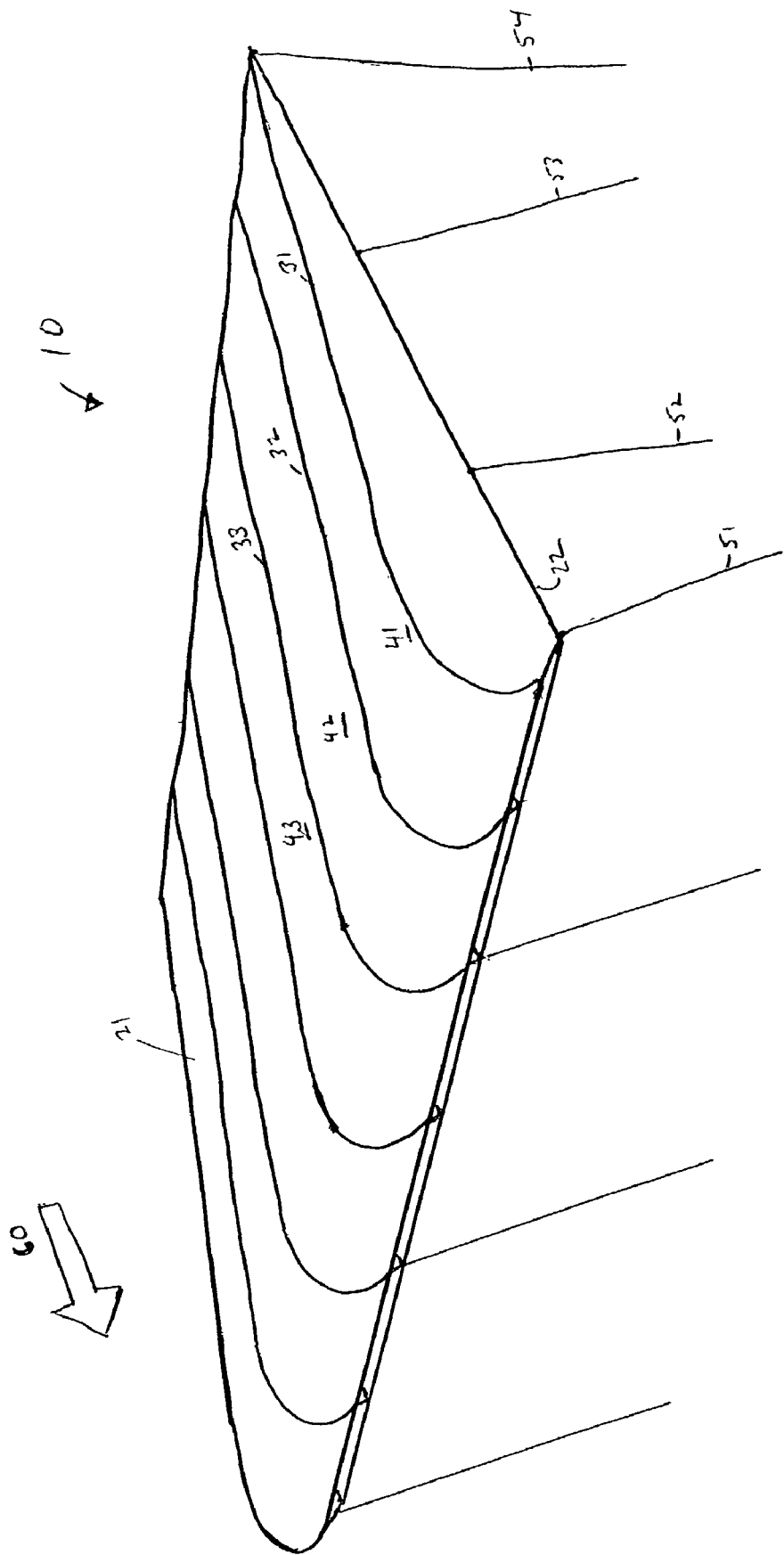
FIG. 3 is a perspective view of a ram air parachute.

FIG. 3 illustrates a canopy of a ram air parachute 10 according to an embodiment of the present invention. The ram air parachute 10 includes a top skin 21 and bottom skin 22. A plurality of vertical ribs 31, 32, 33 are formed between the top skin 21 and the bottom skin 22 forming a plurality of cells 41, 42, 43. Typically, ram air parachutes to which the present invention applies have nine cells. However, any number of cells can be used in connection with the present invention. Suspension lines 51, 52, 53, 54 are attached to at least some of the plurality of ribs. Not all of the suspension lines are shown in FIG. 1. Generally, suspension lines are attached to every other rib in the ram air parachute.

Figure 4:
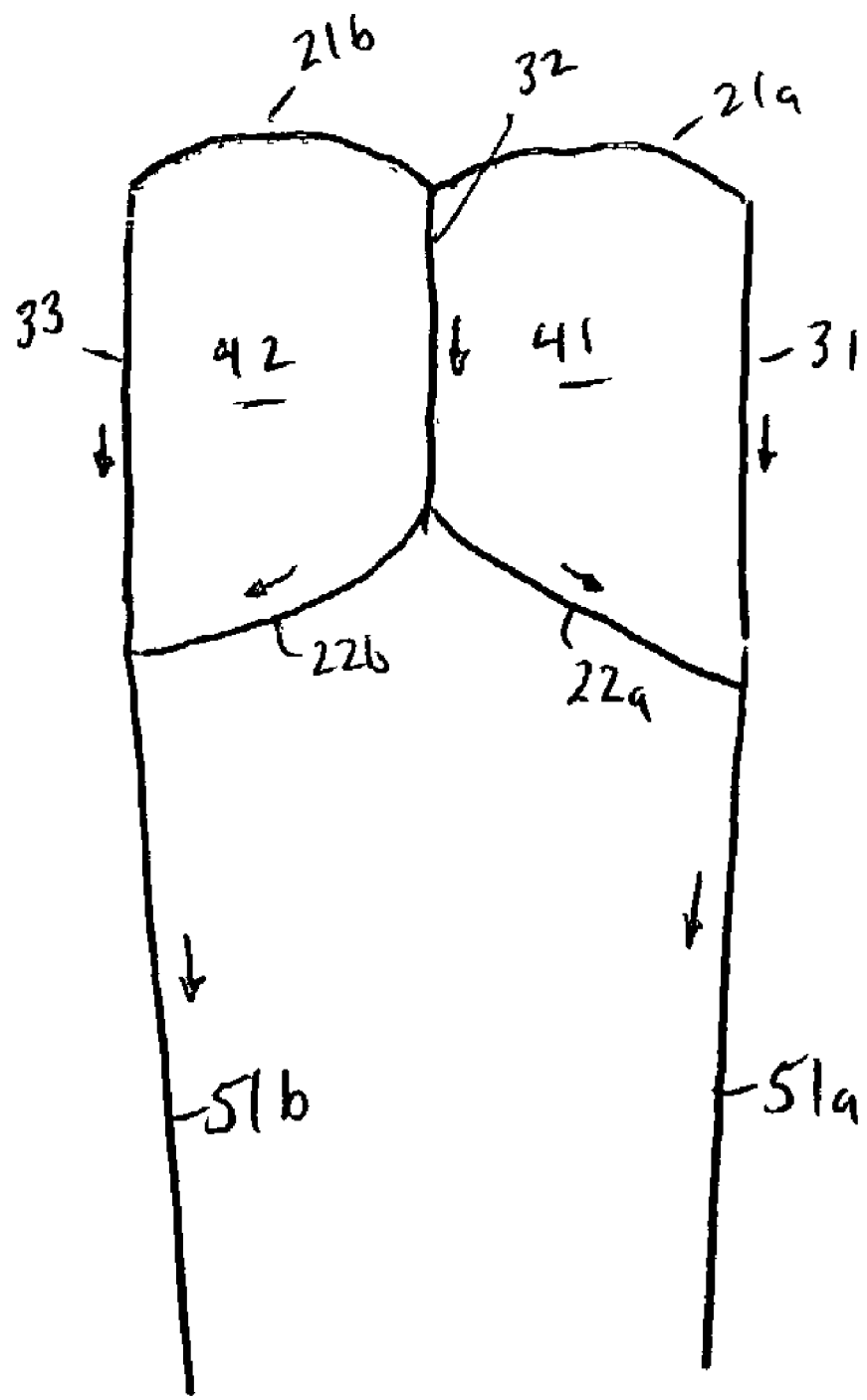
FIG. 4 is a cross sectional view of two cells of a ram air parachute according to an embodiment of the present invention.

FIG. 4 illustrates the structure of a canopy according to an embodiment of the present invention. A cross section of a cell 41, 42 is shown in FIG. 4. However, the same structure would apply to all of the cells of the canopy. The cell 41, 42 is formed by two loaded ribs 31, 33 and unloaded rib 32, and portions of the top skin 21a, 21b and bottom skin 22a, 22b. Suspension lines 51a, 51b are attached to the loaded ribs. As illustrated in FIG. 4, the loaded ribs 31, 33 are of the same height. The unloaded rib 32 is shorter in height than the loaded ribs 31, 33. The bottom skin 22 is not flat, but is angled between the loaded ribs 31, 33 and the non-loaded rib 32. The cell has a trapezoidal shape rather than the rectangular shape of conventional cells. During flight, a portion of the force applied from the suspension lines 51a, 51b to the loaded ribs 31, 32 is transferred via the now angled bottom skin portions 22a, 22b to the non-loaded rib 32. The load transfer results in an improved load distribution and reduced span-wise distortion of the top skin.

The design of the present invention reduces the spanwise top skin distortion of the canopy caused by the non-loaded ribs rising further above the loaded ribs. Thus, the canopy has reduced drag and improved aerodynamics. The design of the present invention is able to achieve a portion of the benefits of cross-braced canopies without the negative aspects caused by cross bracing.

While the present inventions have been described with a certain degree of particularity, it is obvious from the foregoing detailed description that one skilled in the art may make one or more modifications which are suggested by the above descriptions of the novel embodiments.

The invention claimed is:

1. A ram air parachute having a front edge and a trailing edge, comprising:
   a top skin
   a bottom skin opposite the top skin;
   a plurality of loaded ribs disposed between the top skin and the bottom skin, each of said plurality of loaded ribs having a length and a height, said length extending from said parachute front edge to said parachute trailing edge;
   a plurality of non-loaded ribs disposed between the top skin and the bottom skin, each of said plurality of non-loaded ribs having a length, said length extending from said parachute front edge to said parachute trailing edge, said length of said non-loaded ribs substantially the same as said length of said plurality of loaded ribs, wherein at least one non-loaded rib is disposed between two of the loaded ribs and wherein the at least one non-loaded rib has a height shorter than the two of the loaded ribs over its entire length so as to transfer tension from a junction between the bottom skin and the loaded ribs through the bottom skin to the non-loaded rib; and
   a plurality of suspension lines attached to the loaded ribs.

2. The ram air parachute of claim 1, wherein at least one non-loaded rib is disposed between two loaded ribs.

3. A ram air parachute comprising:
   a top skin and a bottom having a leading edge and a trailing edge, wherein said bottom skin is substantially opposite said top skin;
   a plurality of loaded ribs disposed between said top skin and said bottom skin and extending substantially from said leading edge to said trailing edge;
   a plurality of non-loaded ribs disposed between the top skin and the bottom skin and extending substantially from said leading edge to said trailing edge, wherein at least one non-loaded rib is disposed between two of the loaded ribs and wherein the at least one non-loaded rib is shorter in height than the two of the loaded ribs over its entire length so as to transfer tension from a junction between the bottom skin and the loaded ribs through the bottom skin to the non-loaded rib; and
   a plurality of suspension lines attached to the loaded ribs.

4. A ram air parachute comprising:
   a top and a bottom skin having a leading edge and a trailing edge, wherein said bottom skin is substantially opposite said top skin; and
   a plurality of ribs disposed between said top skin and said bottom skin and extending substantially from said leading edge proximate to said trailing edge, wherein a first and at least a second rib are attached to a plurality of suspension lines and at least a third rib is disposed between said first and said at least a second rib and is not attached to said plurality of suspension lines, said at least a third rib having a height that is shorter than said first and said at least a second ribs over its entire length.

5. The ram air parachute as claimed in claim 4 wherein each rib has substantially the same length as an adjacent rib.

6. The ram air parachute as claimed in claim 5 wherein each rib has substantially the same length.

* * * * *